Jan. 10, 1939. P. W. ROBINSON 2,143,713
COMMUTATOR DYNAMO-ELECTRIC MACHINE
Filed Sept. 17, 1937
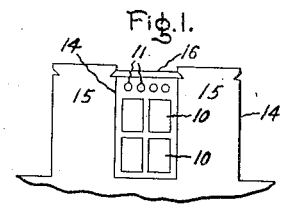
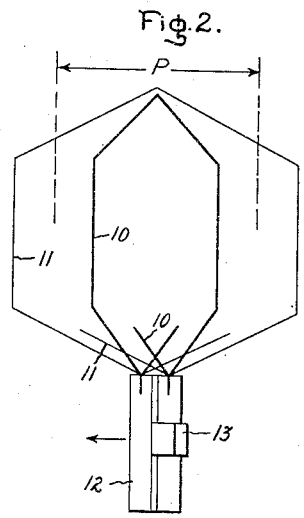
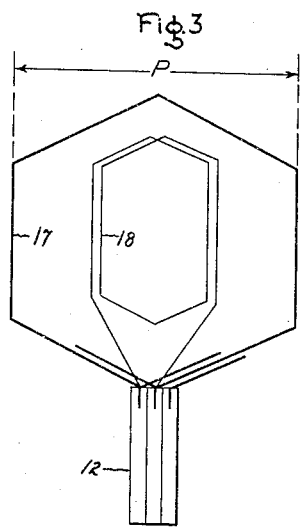
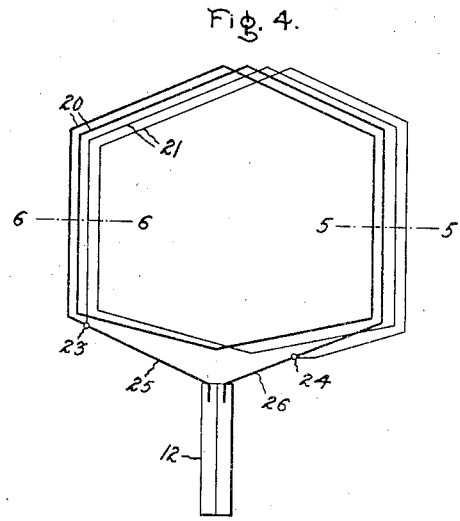
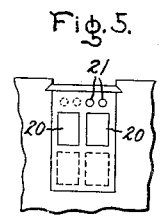
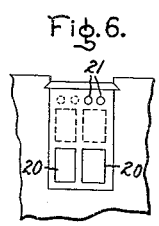
Inventor:
Percy W. Robinson,
by Harry E. Dunham
His Attorney.

Patented Jan. 10, 1939

2,143,713

UNITED STATES PATENT OFFICE 2,143,713

COMMUTATOR DYNAMO-ELECTRIC MACHINE

Percy W. Robinson, Scotia, N. Y., assignor to General Electric Company, a corporation of New York Application September 17, 1937, Serial No. 164,370

6 Claims. (Cl. 171—228)

My invention relates to commutator type dynamo-electric machines and its object is to provide means for improving the commutation of such machines.

In commutator machines not provided with commutating poles, for example, brush shifting dynamo-electric machines, the energy necessary to cause reversal of current in the coils during commutation is ordinarily dissipated in the contact resistance between the brushes and commutator and in sparks drawn between the brushes and the commutator bars as the bars pass under and away from the brushes. This sparking, as is well known, is destructive to the brushes and commutator in varying degrees, depending principally on the amount of voltage induced, which voltage is proportional to the product of the self-inductance of the coils and the rate of decay of the current while the arc is sustained.

I have discovered a method and have provided means for very greatly increasing the time available for current decay, thereby reducing the amount of voltage that can be built up to sustain the arc between brush and commutator bar for any given amount of energy required to reverse the current in the coil undergoing commutation. This method and means consist in providing a small separate winding of relatively high resistance connected to the commutator and so placed in the rotor slots that it will have a small self-inductance and will at the same time have induced in each of its turns, by the working flux of the machine, a voltage equal to that induced in the corresponding turns of the main winding, which is connected to the commutator. The high resistance winding which I call a discharge winding is connected in parallel to the main winding at the commutator. By so arranging and connecting the discharge winding, I not only avoid circulating current between the two windings at fundamental frequency but also provide a discharge circuit connected across each pair of commutator segments so that, instead of the usual abrupt decay of the transient current of commutation in the main coils as corresponding commutator segments leave the brushes, the decay occurs gradually with the transient current flowing through the discharge winding and dissipating the energy that would otherwise cause arcing between commutator segments and brushes. The principle is the same as that involved when a discharge resistance is connected across the terminals of a switch used to open an inductive circuit. It is important that the discharge circuit be of low inductance otherwise it would oppose the sudden flow of a discharge current therethrough and have little beneficial effect. For this reason the discharge winding is placed near the open ends of the slots adjacent the rotor periphery.

The features of my invention which are believed to be novel and patentable will be pointed out in the claims appended hereto. For a better understanding of my invention reference is made in the following description to the accompanying drawing, in which Fig. 1 represents a slot section of a commutated winding embodying the present invention; Fig. 2 illustrates a different pitch disposition of the main and discharge winding coils having the same number of turns per coil; Fig. 3 shows a section of a commutated winding embodying the present invention but with a different winding pitch than is shown in Fig. 1 and using coils of a different number of turns in the two windings. Fig. 4 shows a modification where corresponding main and discharge coils are of the same pitch and placed in the same slots and Figs. 5 and 6 show slot sections at lines 5—5 and 6—6 respectively of Fig. 4.

In Fig. 2, 10 represents a main coil and 11 the discharge coil of a commutated rotor winding. 12 represents bars of the commutator and 13 a commutator brush in position of commutation with respect to the main and discharge coils 10 and 11. The distance P represents a full pole pitch. The pitch of one of the coils, in this instance discharge winding coil 11, is as much over 100% as the pitch of the other coil, in this case main winding coil 10, is under 100% pitch. This is so that the working flux of the machine will induce the same voltage in both coils. By the same voltage I refer to voltages which are not only the same in magnitude, but which are also in the same direction as distinguished from being in opposition. Hence there will be no tendency for current generated in one coil to circulate in the other coil because of a difference in generated voltage of fundamental frequency. In fact both coils may be considered to be generating coils productive of the same voltage. However, the main current of the motor or generator, as the case may be, flows through main coil 10 which is of low resistance. The coils 11 are of high resistance and are not intended to contribute any appreciable added current-carrying capacity to the machine except as this is obtained due to improvement in commutation, although to the extent that coils 11 carry useful currents they do add to the current-carrying capacity of the machine with respect to currents of fundamental frequency. Incidentally, the two windings of different pitch connected to the same commutator tend to suppress harmonic currents of other than fundamental frequency which is desirable in improving commutation.

The important novel feature of my machine lies in the fact that the two sets of coils 10 and 11 have different time constants. The main coils 10 are laid deep in the slots 14, Fig. 1 between the teeth 15 of the laminated magnetic rotor core in the usual manner. The high resistance discharge winding coils 11 are, however, placed in the surface portion of the slots as shown so as to insure low self-inductance in the turns of the discharge winding. It will be readily seen that the section of the path for leakage flux through and above conductors of coils 11 is very small due to their small size and location near the opening of the slots. In other words, the inductance of the coils of winding 11 is very much less than the inductance of the coils of winding 10. 16 represents a non-magnetic coil-retaining wedge.

In Fig. 2 let it be assumed that the commutator bars 12 are moving in the direction of the arrow with respect to stationary brush 13. The left bar is about to break contact with the brush and interrupt the current flow therebetween. Owing to the high self-induction of main coil 10, it is difficult for this current flow to stop instantly and as a consequence there is a tendency for it to keep on flowing and to produce an arc as the brush leaves the bar. The presence of the low self-inductance coil 11 does not reduce the tendency of current to continue to flow in coil 10. It does, however, provide another path of low inductance in which it may flow and hence an arcing voltage does not build up between brush 13 and the commutator bar leaving the brush. Instead this inductive current of coil 10 discharges through the high resistance low-inductance coil 11 and is dissipated without arcing.

If the discharge path had an inductance equivalent to or greater than the inductance of coil 10 this beneficial result would not be produced. It is to be noted that prior to commutation, current flows in both coils 10 and 11 in the same direction towards or away from the brush. Hence, if coil 11 were of high inductance, we would simply have two highly inductive coil circuits to commutate at once. However, by placing the coils 11 at the opening of the slots they have a minimum of self-inductance and the currents therein, small in any event, can die out and reverse quickly without building up any appreciable inductive voltage at the brushes and, in addition, can absorb the inductive current of coils 10 and prevent it from building up an arcing voltage at the brushes.

Mechanically, both coils 10 and 11 are commutated at the same instant and in the same length of time. However, electrically, coil 11 is commutated in the time allowed for mechanical commutation while coil 10 is allowed and takes a longer time, the latter stage of the commutation of coil 10 being through coil 11 instead of between commutator segment and brush. Thus, I have provided a method whereby the currents in the main coils undergoing commutation have a longer time to decay and reverse than is permitted by mechanical commutation, which method effectively prevents the building up of an arcing voltage at the commutator.

It is not essential that the main and discharge coils have the pitch and turn relationship represented in Fig. 2. Another arrangement is shown in Fig. 3. In Fig. 3, 17 is the main coil having one turn and having a 100% pitch. 18 is the high resistance discharge coil having two turns per coil and having 33⅓% pitch. The 33⅓% pitch two turn coil will generate the same voltage as the 100% pitch single turn coil and hence their voltages will be equal. The high resistance 2-turn coil will, however, be made of low self-inductance by placing in the open end of the slots as in Fig. 1.

In machines where harmonic currents are not a troublesome factor, the main and discharge coils may be of the same pitch, and laid in the same slots, the high resistance coil being in the open end of the slot. This is represented in Fig. 4 where 20 represents the main coil and 21 the discharge coil. Both coils have two turns, are of the same pitch and are contained in the same slots, Figs. 5 and 6 representing the positions of these turns in the right and left slots, in which the coils are contained. Other coil sides in the slots are indicated in dotted lines. In this case it will be unnecessary to have individual connections to the commutator segments for both the main and discharge coils, and I have shown the discharge coil 21 connected at points 23 and 24 to the commutator leads 25 and 26 of the main coil 20.

The invention is especially advantageous in alternating current commutator machines which have relatively high induced voltage between adjacent commutator segments during the commutation period, such for example as the machine described in Schrage Reissue Patent 14,031, December 14, 1915, as the circulating current in such machines, due to the short-circuiting effect of the brushes, is usually greater than the load current.

This method of improving commutation is free from the main objection to the conventional resistance leads sometimes used between the commutator segments and armature coils: namely the risk of burning out the resistance leads due to severe starting duty. In my invention only a small portion of the load current flows through the discharge winding whereas it all flows through the conventional type of resistance leads.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In a commutator type dynamo-electric machine, a slotted rotor core of magnetic material, a main winding having coils in said slots, a commutator to which said coils are connected, commutating brushes on the commutator, and a high resistance winding also connected to said commutator, said high resistance winding having coils in the entrance of the slots containing the main winding coils so as to have a low reactance as compared to the main winding coils, both of such windings producing the same voltage in the same direction between the commutator segments to which they are connected, said high resistance winding serving as a discharge winding for the main winding during commutation.

2. In a commutator type dynamo-electric machine, an open slot magnetic rotor core, main and high resistance windings having coils contained in the slots of said core, a commutator to which coils of both windings are connected in parallel, said coils producing equal voltages in the same direction across corresponding points of connection to said commutator, the main winding coils being laid deep in the slots and the high resistance winding coils being laid near the opening of the slots so as to have low self-inductance as compared to the self-inductance of the main winding coils.

3. In a commutator type dynamo-electric machine, a rotor therefor having a main winding made up of coils of high self-inductance and a high resistance discharge winding made up of coils of a low self-inductance, a commutator to which both sets of coils are connected, the coils in the two windings being of different pitch but both windings producing the same voltage at corresponding commutator segments to which they are connected.

4. In a commutator type dynamo-electric machine, a slotted magnetic rotor core, a main winding and a high resistance discharge winding in the slots of said core, a commutator to which said windings are connected in parallel, said windings having the same number of turns per coil and coils of the same pitch, the coils of both windings which are in the same slots being connected to the same commutator segments, the coils of the high resistance winding being contained in and near the opening of the slots and the coils of the main winding being contained in the slots beneath the high resistance coils.

5. In a commutator type dynamo-electric machine, an open slot magnetic rotor core, a main winding contained deep in the slots and a high resistance winding contained in the slots near their openings, the two windings having coils of different pitches and different numbers of turns but producing the same voltage, a commutator and connections from both windings to said commutator, coils in the different windings which produce the same voltage at any given instant being connected to the same commutator segments.

6. In a commutator type dynamo-electric machine a rotor having a low resistance winding of high inductance and a high resistance winding of low inductance, a commutator to which both windings are connected in parallel relation, commutator brushes bearing on said commutator, the connections from any one segment of said commutator to both windings being to points in said windings which are of equal potential whereby there are no circulating currents between the two windings of fundamental frequency except that which is incident to the difference in the inductance of the two windings when they are commutated simultaneously, the high resistance winding serving as a discharge winding for the main winding during commutation.

PERCY W. ROBINSON.